Patented Aug. 29, 1939

2,171,364

UNITED STATES PATENT OFFICE 2,171,364

AZO DYES

Chester W. Hannum and Swanie S. Rossander, Wilmington, Del., assignors to E. I. du Pont de Nemours & Company, Wilmington, Del., a corporation of Delaware No Drawing. Application July 8, 1937,
Serial No. 152,526

4 Claims. (Cl. 260—169)

A. This invention relates to azo dyes which are particularly useful on cellulose, within which term is included those compounds normally called cellulose and those which are normally called regenerated cellulose.

B. There are known in the art dyes of the type described in D. R. P. 163,321 (1905) which are reasonably satisfactory when dyed on cellulose fiber but which, when subsequently developed with coupling agents, have unsatisfactory washing fastness. The colors themselves are blues and violets of excellent shade but their commercial possibilities are handicapped by the named deficiencies.

C. It is an object of this invention to produce blue and violet dyes of the general type discussed which have improved fastness to washing and properties in all other regards at least equal to the best colors of the type previously produced.

D. The objects of the invention are accomplished, generally speaking, by diazotizing a 1-amino-8-naphthol-disulfonic acid and coupling it to a primary amino compound having a single benzene or alpha-naphthylamine nucleus, diazotizing the product and coupling it to a primary amino compound having a single benzene or alpha-naphthylamine nucleus, diazotizing the resulting compound and coupling it to an amino benzene or an amino phenyl-pyrazolone. These new dyes, while of excellent substantivity to cotton, are not of themselves the finished colors but are further diazotized and coupled with suitable components, an invention, however, which is set forth in a separate application filed of even date herewith.

E. Among the first components may be mentioned 1-amino-8-naphthol-3:6-disulfonic acid, 1-amino-8-naphthol-4:6-disulfonic acid and 1-amino-8-naphthol-3:5-disulfonic acid. The two middle components are anilines or naphthylamines among which may be named 1-aminonaphthalene-6-sulfonic acid, aniline, meta-toluidine, 2:5-dimethoxy aniline, para-xylidine, ortho-anisidine, 1-amino-naphthalene-7-sulfonic acid. The end component is as indicated. All the aryl nuclei of the compounds may have one or more substituents from the class hydrogen, alkyl, alkoxy, halogen, sulfonic acid, and carboxylic acid.

F. The following examples illustrate the invention but are not limitative thereof.

Example I

Slurry 17.2 parts of H-acid with 800 parts water at 35° C. Add 28 parts of 2 normal soda ash solution. The H-acid should be completely dissolved and acid to litmus paper. Add 18 parts of 10 normal hydrochloric acid. Immediately add 25 parts of 2 normal sodium nitrite. Maintain a slight excess of nitrite for two minutes. Add 63 parts of 2 normal sodium acetate, followed by 10 parts of acetic anhydride. Stir one half minute and cool to 0° C. with an excess of ice.

Dissolve 7.3 parts of alpha-naphthylamine in 100 parts of water and 5.1 parts of 10 normal hydrochloric acid at 70° C.

Add the alpha naphthylamine hydrochloride solution slowly to the diazo. Couple for 30 minutes at 0° C. Add 22 parts soda ash. Stir 10 minutes. Add 6 parts of acetic anhydride. Stir 10 minutes. The test for excess alpha naphthylamine should be negative. Temperature 0–4° C. Add 50 parts of 10 normal hydrochloric acid, followed by 22 parts of 2 normal sodium nitrite. Maintain a slight excess nitrite for one hour at 0–5° C. Remove the excess nitrite by the cautious addition of a small amount of a dilute solution of aniline disulfonic acid. Add 9 parts of sodium acetate. Slurry 8.9 parts of mixed Cleve's acid with 300 parts of water, and add soda ash (approx. 2.1 parts) until complete solution acid to litmus is obtained. Add this solution to the above immediately after the addition of the 9 parts of sodium acetate. Stir one hour at 0–5° C. Add 60 parts of 10 normal hydrochloric acid, followed by 21 parts of 2 normal sodium nitrite. Stir two hours. Remove the slight excess sodium nitrite by the cautious addition of aniline disulfonic acid solution.

Add 6.8 parts of cresidine to 100 parts of water and heat to 75° C. Add 5 parts of 10 normal hydrochloric acid to get complete solution. Cool to 40° C. Add to the above solution. Immediately add 80 parts of sodium acetate. Stir twelve hours. Slowly warm to 85° C. Add 100 parts of 10 normal caustic soda solution. Add 2% soda ash by weight per valence (approx. 60 parts soda ash). Heat to 95° C. and hold at this temperature for two hours. Salt 15% to a brownish rim. Filter. Dissolve the residue in 1500 parts water at 80° C. Add hydrochloric acid (approx. 50 parts 2 normal) until acid to Congo red. Slowly salt 15% to a light rim when spotted on filter paper. Filter. Dry at 80-90° C. The dried powder is black in appearance. Its probable formula is:

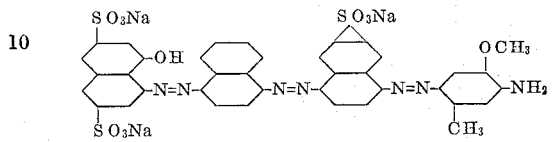

G. Following is given a partial list of the representative dyes of the new type made in a similar manner. The developed dyeings of these products show improved washing fastness.

| Ex. | | Direct shade |
|---|---|---|
| 2 | H-acid⟶alpha-naphthylamine⟶1:6-Cleve's acid⟶cresidine. | Blue. |
| 3 | H-acid⟶alpha-naphthylamine⟶1:7-Cleve's acid⟶cresidine. | Do. |
| 4 | H-acid⟶alpha-naphthylamine⟶mixed Cleve's acid⟶cresidine. | Do. |
| 5 | H-acid⟶alpha-naphthylamine⟶1:6-Cleve's acid⟶meta-toluidine. | Do. |
| 6 | H-acid⟶alpha-naphthylamine⟶1:6-Cleve's acid⟶para-xylidine. | Do. |
| 7 | H-acid⟶alpha-naphthylamine⟶mixed Cleve's acid⟶benzoyl-meta-phenylene diamine. | Do. |
| 8 | H-acid⟶alpha-naphthylamine⟶mixed Cleve's acid⟶acetyl-meta-phenylene diamine. | Do. |
| 9 | H-acid⟶alpha-naphthylamine⟶1:7-Cleve's acid⟶para-xylidine. | Do. |
| 10 | H-acid⟶cresidine⟶1:7-Cleve's acid⟶cresidine. | Do. |
| 11 | H-acid⟶alpha-naphthylamine⟶mixed Cleve's acid⟶para-xylidine. | Do. |
| 12 | H-acid⟶alpha-naphthylamine⟶1:6-Cleve's acid⟶1-meta-amino-phenyl-3-methyl-5-pyrazolone. | Do. |
| 13 | H-acid⟶alpha-naphthylamine⟶1:6-Cleve's acid⟶1-meta-amino-phenyl-5-pyrazolone-3-carboxylic acid. | Do. |
| 14 | 1-amine-8-naphthol-4:6-disulfonic acid⟶alpha-naphthylamine⟶1:6-Cleve's acid⟶cresidine. | Do. |
| 15 | 1-amino-8-naphthyl-3:5-disulfonic acid⟶alpha-naphthylamine⟶1:6-Cleve's acid⟶cresidine. | Do. |

The arrows mean coupled by the diazo reaction.

H. The processes and the starting materials, illustrated by the examples are subject to considerable variations. The choice of the starting materials within the limitations, described below, determines to a moderate degree the shades of the dyeings (direct and developed), but affects only to a minor degree the characteristic properties, in which the new dyes show marked improvement over the products of the prior art.

I. In the preferred forms of the invention the first component will be one of the amino-naphthol-disulfonic acids specifically named hereinabove; one of the middle components will be a 1-naphthylamine-sulfonic acid in which the sulfonic acid is in position 6 or 7 (or a mixture of these two isomers may be used). Solubilizing groups should be restricted to that number which produces a sufficient solubility without adversely affecting the washing fastness. The end component should not contain solubilizing groups in the preferred form of the invention if it has a benzene nucleus, but it may contain a solubilizing group if it has a pyrazolone nucleus. In order to complete the coupling of certain members of this class, it is necessary to couple in the form of their omega sulfonic acid derivatives. Aniline and ortho-anisidine are examples of this class. The omega sulfonic acid derivatives will be subsequently hydrolyzed by treatment with acid or alkali at 75° C. Meta-toluidine, cresidine, 2:5-dimethoxy-aniline may be coupled directly. Cresidine, meta-toluidine, and para-xylidine give excellent results.

J. The products of the invention are trisazo blue dyes having excellent substantivity to cellulose and which, when subsequently developed with appropriate coupling agents produce colors of outstanding fastness to washing and of excellent fastness to light.

K. As many apparently widely different embodiments of this invention may be made without departing from the spirit and scope thereof, it is to be understood that we do not limit ourselves to the specific embodiments thereof except as defined in the appended claims.

We claim:

1. A compound represented by the formula:

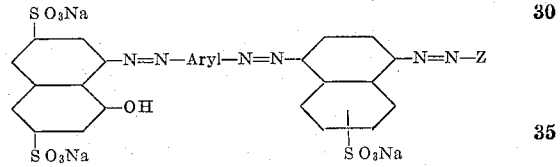

in which Aryl is a radical having a single benzene or naphthalene nucleus and Z is a radical having a single benzene nucleus and an amino group substituted thereon.

2. A compound represented by the formula:

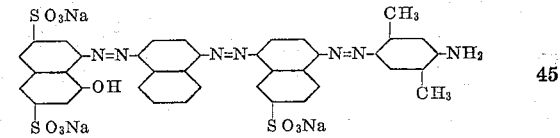

3. A compound represented by the formula:

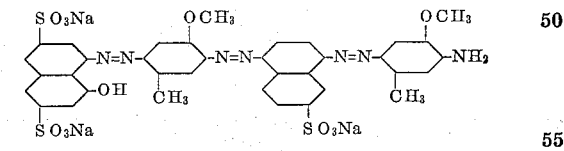

4. A compound represented in the form of its free acid by the formula:

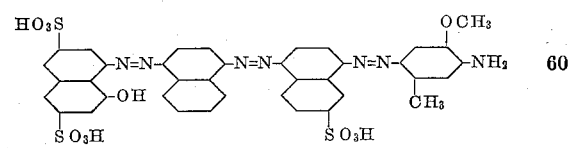

CHESTER W. HANNUM.
SWANIE S. ROSSANDER.

CERTIFICATE OF CORRECTION.

Patent No. 2,171,364. August 29, 1939.

CHESTER W. HANNUM, ET AL.

It is hereby certified that error appears in the printed specification of the above numbered patent requiring correction as follows: Page 2, first column, line 42, in the table, Example 14, for "1-amine" read 1-amino; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.